(12) United States Patent
Benstead et al.

(10) Patent No.: US 11,629,016 B2
(45) Date of Patent: Apr. 18, 2023

(54) SYSTEM AND A METHOD FOR TRANSFERRING SOLID PARTICLES FROM A FIRST ENVIRONMENT AT A FIRST GAS PRESSURE TO A SECOND ENVIRONMENT AT A SECOND GAS PRESSURE

(71) Applicant: TRICOYA TECHNOLOGIES LTD, London (GB)

(72) Inventors: Stephen John Benstead, Manchester (GB); Theodorus Gerardus Marinus Maria Kappen, Rosmalen (NL)

(*) Notice: Subject to any disclaimer, the term of this patent is extended or adjusted under 35 U.S.C. 154(b) by 0 days.

(21) Appl. No.: 17/310,087

(22) PCT Filed: Jan. 20, 2020

(86) PCT No.: PCT/EP2020/051248
§ 371 (c)(1),
(2) Date: Jul. 15, 2021

(87) PCT Pub. No.: WO2020/148456
PCT Pub. Date: Jul. 23, 2020

(65) Prior Publication Data
US 2022/0073289 A1 Mar. 10, 2022

(30) Foreign Application Priority Data
Jan. 18, 2019 (EP) .................................... 19152620

(51) Int. Cl.
*B65G 53/46* (2006.01)
*B65G 53/36* (2006.01)
(52) U.S. Cl.
CPC .......... *B65G 53/4691* (2013.01); *B65G 53/36* (2013.01)
(58) Field of Classification Search
CPC ...................... B65G 53/4691; C10J 2200/156
(Continued)

(56) References Cited

U.S. PATENT DOCUMENTS 2,985,324 A * 5/1961 Balentine ................... B01J 3/02
414/217
3,190,509 A * 6/1965 Kirchhoefer ....... B65G 53/4691
414/221
(Continued)

FOREIGN PATENT DOCUMENTS

CN 101903502 A 12/2010
CN 206384574 U 8/2017
(Continued)

OTHER PUBLICATIONS

International Search Report & Written Opinion dated Apr. 23, 2020 from PCT Application No. PCT/EP2020/051248.

*Primary Examiner* — Joseph A Dillon, Jr.
(74) *Attorney, Agent, or Firm* — Innovation Capital Law Group, LLP; Vic Lin

(57) ABSTRACT

A system for transferring solid particles from a first environment at a first gas pressure to a second environment at a second gas pressure. The system comprises a first rotary valve having an inlet which is in fluid communication with the first environment, a second rotary valve having an outlet which is in fluid communication with the second environment, and an intermediate housing bounding an intermediate channel, of which an inlet is fluidly connected to an outlet of the first rotary valve and of which an outlet is fluidly connected to an inlet of the second rotary valve. The intermediate channel is fluidly connected to a third environment maintained at a third gas pressure. The third gas pressure is higher than both the first gas pressure and the second gas pressure or lower than both the first gas pressure and the second gas pressure.

8 Claims, 1 Drawing Sheet

(58) Field of Classification Search
USPC ........................................................ 414/221
See application file for complete search history.

(56) References Cited

U.S. PATENT DOCUMENTS

| | | | | | |
|---|---|---|---|---|---|
| 3,729,105 | A * | 4/1973 | Huebler | ............ | B65G 53/4691 |
| | | | | | 414/221 |
| 4,327,055 | A * | 4/1982 | Luckenbach | .......... | C10G 11/18 |
| | | | | | 422/219 |
| 4,403,909 | A * | 9/1983 | Greenwood | ............ | B01J 8/003 |
| | | | | | 422/219 |
| 4,576,712 | A * | 3/1986 | Greenwood | ........... | B01J 8/0035 |
| | | | | | 422/219 |
| 4,728,250 | A * | 3/1988 | Wilhelm | ............ | B01D 11/0242 |
| | | | | | 406/146 |
| 4,758,118 | A * | 7/1988 | Rachner | .................... | F27B 1/20 |
| | | | | | 110/101 CC |
| 4,872,969 | A * | 10/1989 | Sechrist | ................ | B01J 8/0035 |
| | | | | | 208/147 |
| 4,955,989 | A * | 9/1990 | Mink | ........................ | B01J 3/02 |
| | | | | | 48/210 |
| 5,143,521 | A * | 9/1992 | Dewitz | ...................... | C10J 3/84 |
| | | | | | 48/210 |
| 5,275,215 | A * | 1/1994 | Derby | ....................... | B65B 1/26 |
| | | | | | 414/221 |
| 5,338,440 | A * | 8/1994 | Sechrist | ................... | B01J 8/001 |
| | | | | | 208/174 |
| 5,558,472 | A * | 9/1996 | Ogawa | ................. | B65G 53/521 |
| | | | | | 406/197 |
| 6,287,056 | B1 * | 9/2001 | Szikszay | ................ | B65G 53/66 |
| | | | | | 406/146 |
| 6,394,733 | B1 * | 5/2002 | Toda | ................. | H01L 21/67017 |
| | | | | | 414/217 |
| 6,666,629 | B2 * | 12/2003 | Hirsch | ................... | B01J 8/0025 |
| | | | | | 406/197 |
| 6,755,980 | B1 * | 6/2004 | Van Den Born | .......... | C10J 3/52 |
| | | | | | 414/217 |
| 6,953,315 | B2 * | 10/2005 | Cartwright | ........... | G05D 7/0652 |
| | | | | | 414/217 |
| 6,971,786 | B2 * | 12/2005 | Krambrock | ............ | B65G 53/30 |
| | | | | | 406/92 |
| 6,994,497 | B1 * | 2/2006 | Eriksson | ................... | F23J 3/02 |
| | | | | | 406/165 |
| 7,241,080 | B2 * | 7/2007 | Klobucar | .................. | F04F 5/54 |
| | | | | | 406/146 |
| 7,600,950 | B2 * | 10/2009 | Yuan | ...................... | B65G 53/06 |
| | | | | | 406/150 |
| 7,841,807 | B2 * | 11/2010 | Naunheimer | ............ | B01J 8/008 |
| | | | | | 406/197 |
| 7,841,808 | B2 * | 11/2010 | Naunheimer | .......... | C10G 49/14 |
| | | | | | 406/197 |
| 7,874,769 | B2 * | 1/2011 | Naunheimer | ............ | B01J 8/003 |
| | | | | | 406/197 |
| 7,878,736 | B2 * | 2/2011 | Naunheimer | ............ | B01J 8/008 |
| | | | | | 406/198 |
| 7,878,737 | B2 * | 2/2011 | Naunheimer | ............ | B01J 8/125 |
| | | | | | 406/123 |
| 7,887,264 | B2 * | 2/2011 | Naunheimer | .......... | B01J 8/0025 |
| | | | | | 406/198 |
| 8,075,227 | B2 * | 12/2011 | Yuan | ....................... | B01J 8/003 |
| | | | | | 422/291 |
| 8,596,931 | B2 * | 12/2013 | Nagashima | ............ | B01J 20/267 |
| | | | | | 406/197 |
| 8,651,772 | B2 | 2/2014 | Kim et al. | | |
| 9,096,732 | B2 * | 8/2015 | Nogi | ........................ | C08J 3/075 |
| 9,108,808 | B2 * | 8/2015 | Furuyama | ............. | B65G 53/40 |
| 9,115,320 | B2 * | 8/2015 | Hu | ............................ | C10J 3/506 |
| 9,573,775 | B2 * | 2/2017 | Shimono | ................ | B65G 53/66 |
| 9,631,869 | B2 * | 4/2017 | Shimono | ............... | F27D 3/0033 |
| 9,637,325 | B2 * | 5/2017 | Albin | ..................... | B01J 8/0035 |
| 10,000,347 | B2 * | 6/2018 | Newton | ............. | B65G 53/4616 |
| 10,138,077 | B2 * | 11/2018 | Ellis | ....................... | B65G 53/66 |
| 11,320,204 | B2 * | 5/2022 | Kusunose | ............. | F27D 3/0033 |
| 2009/0110517 | A1 * | 4/2009 | Yuan | ...................... | B65G 53/06 |
| | | | | | 414/217 |
| 2009/0142148 | A1 | 6/2009 | Yuan | | |
| 2010/0014946 | A1 * | 1/2010 | Yuan | ...................... | B65G 53/06 |
| | | | | | 414/217 |
| 2011/0110730 | A1 | 5/2011 | Nogi et al. | | |
| 2011/0204001 | A1 * | 8/2011 | Gaudfrin | ................ | B01D 33/766 |
| | | | | | 210/768 |
| 2011/0217130 | A1 * | 9/2011 | Yuan | ........................ | B01J 8/003 |
| | | | | | 406/183 |

FOREIGN PATENT DOCUMENTS

| | | |
|---|---|---|
| CN | 208135473 U | 11/2018 |
| DE | 19958604 A1 | 6/2001 |
| EP | 0607964 A1 | 7/1994 |
| EP | 0995488 A2 | 4/2000 |
| FR | 1569632 A | 6/1969 |

* cited by examiner

SYSTEM AND A METHOD FOR TRANSFERRING SOLID PARTICLES FROM A FIRST ENVIRONMENT AT A FIRST GAS PRESSURE TO A SECOND ENVIRONMENT AT A SECOND GAS PRESSURE

FIELD

The invention relates to a system for transferring solid particles from a first environment at a first gas pressure to a second environment at a second gas pressure. The invention also relates to a method for transferring solid particles from a first environment at a first gas pressure to a second environment at a second gas pressure.

BACKGROUND

Known systems for transferring solid particles include rotary valves, also known as rotary feeders or rotary airlocks. Rotary valves are used in solid particles processing industries for metering of solid flow, for pneumatic conveying, and as a boundary to avoid propagation of dust explosion. In pneumatic conveying systems, solid particles drop through the rotary valve into a moving stream of gas. The rotary valve acts as pressure boundary between the low pressure solid particles storage, and the higher pressure conveying gas. There is a flow of leakage gas across the rotary valve vanes, from the high to low pressure sides of the rotary valve.

A known system which is used to introduce solid particles into a process that is running at a different pressure is a lock hopper system. This system achieves isolation between a storage environment wherein the solid particles are stored, and a processing environment wherein the solid particles are processed. The lock hopper system runs on a batch cycle with a batch of solid particles being introduced into an intermediate vessel, where the pressure/atmosphere is changed before discharging the batch into the process. US20090142148 discloses such a lock hopper system that is configured for batch operation.

A disadvantage of a lock hopper system is that it operates in batches. This means that it is not possible to have a continuous flow of solid particles from the storing environment to the process environment.

FR1569632 disclose the use of special rotary valves which are mounted in series and which transfer solid particles from a higher pressure environment to a lower pressure environment. The pressure between the two rotary valves is maintained at a value between the higher pressure and the lower pressure. Thus, transfer of gas from the high pressure environment to the low pressure environment is possible and a gaseous isolation between the higher pressure and the lower pressure environment is not obtained.

SUMMARY OF THE INVENTION

An object of the invention is to provide a system for transferring solid particles from a first environment at a first gas pressure to a second environment at a second gas pressure, wherein the first environment and the second environment are completely gaseous isolated and with which system a continuous flow of solid particles from the first environment to the second environment is possible. Completely gaseous isolated in this context means that there is no flow of gas from the first environment into the second environment and no flow of gas from the second environment into the first environment.

To that end, the invention provides a system for transferring solid particles from a first environment at a first gas pressure to a second environment at a second gas pressure. More particular, the system according to the invention comprises a first rotary valve, a second rotary valve, and an intermediate channel housing. The first rotary valve has an inlet which is in fluid communication with the first environment. The second rotary valve has an outlet which is in fluid communication with the second environment. The intermediate channel housing bounds an intermediate channel. An inlet of the intermediate channel housing is fluidly connected to an outlet of the first rotary valve and an outlet of the intermediate channel housing is fluidly connected to an inlet of the second rotary valve. The first rotary valve, in operation, allows the solid particles to transfer from the first environment to the intermediate channel. The second rotary valve, in operation, allows the solid particles to transfer from the intermediate channel to the second environment. The intermediate channel is fluidly connected to a third environment maintained at a third gas pressure. The third gas pressure is higher than both the first gas pressure and the second gas pressure or lower than both the first gas pressure and the second gas pressure.

The rotary valves are able to continuously transfer solid particles form the first environment to the second environment. Depending on the third gas pressure with respect to the first gas pressure, gas will either leak from the third environment, through the intermediate channel, and across the first rotary valve into the first environment, or from the first environment, across the first rotary valve, and through the intermediate channel into the third environment. Also, depending on the intermediate gas pressure with respect to the second gas pressure, gas will either leak from third environment, through the intermediate channel, and across the second rotary valve into the second environment, or from the second environment, across the second rotary valve, and through the intermediate channel into the third environment. Because the third gas pressure is maintained either higher or lower than both the first gas pressure and the second gas pressure, gas will either leak from the third environment, through the intermediate channel, and across the first and second rotary valves into the first and second environments, or gas will leak from the first and second environments, across the first and second rotary valves, and through the intermediate channel into the third environment. Either way, no gas will flow from the first environment into the second environment or from the second environment into the first environment. Thus a total gaseous isolation between the first environment and the second environment is achieved. The system can be used in situations where it is desired to e.g. stop toxic or odorous materials leaving a system, stop oxygen or air entering a system, stop reactive gasses from mixing, or for any other use known in the art.

The invention further provides a method for transferring solid particles from a first environment at a first gas pressure to a second environment at a second gas pressure. More particular the method comprises providing a system for transferring the solid particles. The system comprises a first rotary, a second rotary valve, and an intermediate channel housing. The first rotary valve has an inlet which is in fluid communication with the first environment. The second rotary valve has an outlet which is in fluid communication with the second environment. The intermediate channel housing bounds an intermediate channel. An inlet of the intermediate channel housing is fluidly connected to an outlet of the first rotary valve. An outlet of the intermediate channel housing is fluidly connected to an inlet of the second rotary valve. The intermediate channel is fluidly connected to a third environment. The first rotary valve, in operation, allows the solid particles to transfer from the first environment to the intermediate channel. The second rotary valve, in operation, allows the solid particles to transfer from the intermediate channel to the second environment. The method further comprises maintaining a third gas pressure in the third environment at a pressure which is either higher than both the first gas pressure and the second gas pressure or lower than both the first gas pressure and the second gas pressure.

The effects and the advantages of the method for transferring solid particles from a first environment at a first gas pressure to a second environment at a second gas pressure are the same as the effects and advantages as described above with reference to the system according to the invention and these effects and advantages are inserted here by reference.

The present invention will be further elucidated with reference to figures of exemplary embodiments. The embodiments may be combined or may be applied separately from each other.

DETAILED DESCRIPTION OF THE FIGURES

Figure 2:
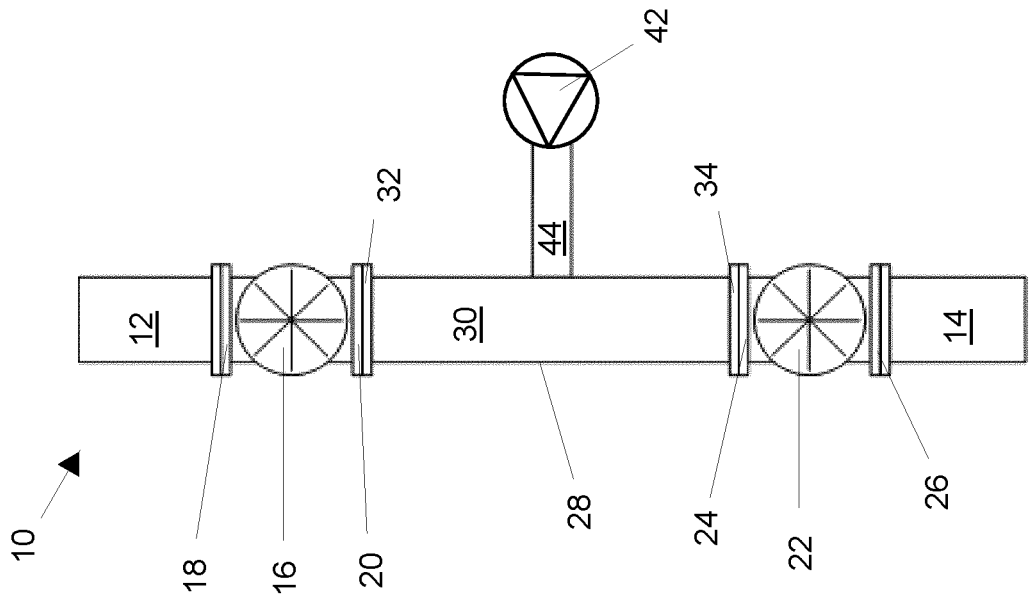
FIG. 2 shows a schematic view of another example of a system according to the invention, wherein the system comprises a gas pump.
Figure 1:
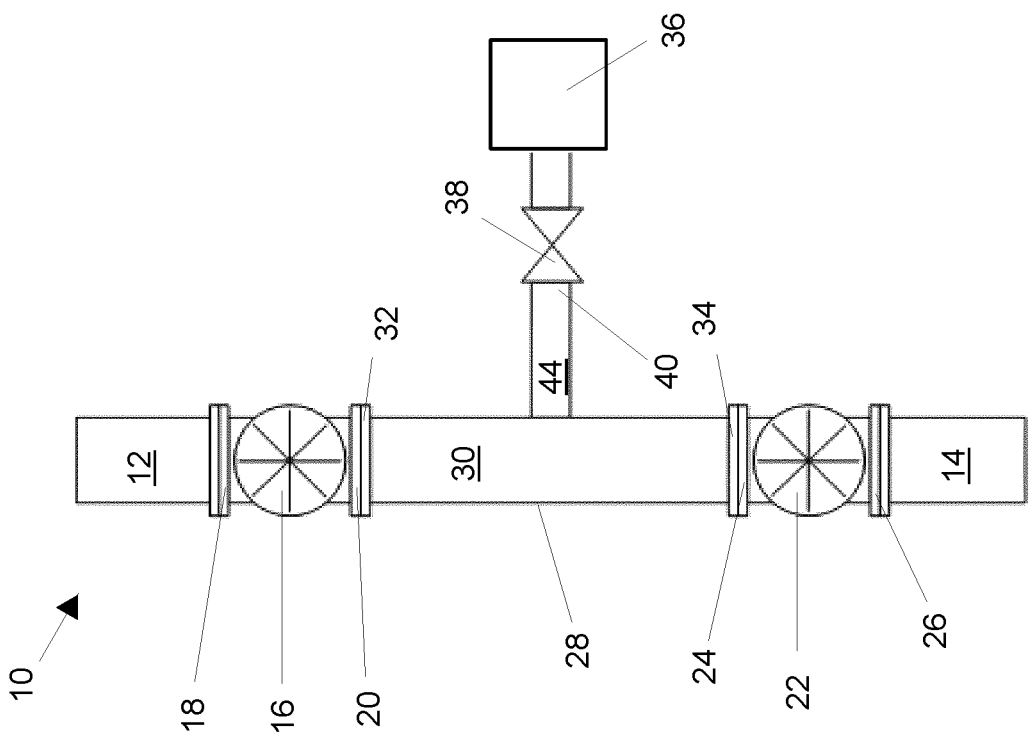
FIG. 1 shows a schematic view of an example of a system according to the invention, wherein the system comprises a low pressure sink.

In this application similar or corresponding features are denoted by similar or corresponding reference signs. The description of the various embodiments is not limited to the examples shown in the figures and the reference numbers used in the detailed description and the claims are not intended to limit the description of the embodiments, but are included to elucidate the embodiments by referring to the examples shown in the figures.

In the most general terms, the invention relates to a system 10 for transferring solid particles from a first environment 12 at a first gas pressure to a second environment 14 at a second gas pressure. The system comprises a first rotary valve 16, a second rotary valve 22, and an intermediate channel housing 28. The first rotary valve 16 has an inlet 18 which is in fluid communication with the first environment 12. The second rotary valve 22 has an outlet 26 which is in fluid communication with the second environment 14. The intermediate channel housing 28 bounds an intermediate channel 30. An inlet 32 of the intermediate channel housing 28 is fluidly connected to an outlet 20 of the first rotary valve 16. An outlet 34 of the intermediate channel housing 28 is fluidly connected to an inlet 24 of the second rotary valve 22. The first rotary valve 16, in operation, allows the solid particles to transfer from the first environment 12 to the intermediate channel 30. The second rotary valve 22, in operation, allows the solid particles to transfer from the intermediate channel 30 to the second environment 14. The intermediate channel 30 is fluidly connected to a third environment (44) maintained at a third gas pressure. The third gas pressure is higher than both the first gas pressure and the second gas pressure or, alternatively, is lower than both the first gas pressure and the second gas pressure.

The effect and advantages of the system 10 for transferring solid particles from a first environment 12 at a first gas pressure to a second environment 14 at a second gas pressure have been described in the summary section and these effects and advantages are inserted here by reference. The first environment 12 may be a storage environment. The second environment 14 may be a processing environment which may have a higher pressure than the first environment 12. The second environment 14 may e.g. be a part of a pneumatic conveying system comprising a conveying gas.

In an embodiment the first and the second rotary valves 16, 22 may be driven simultaneously. Both the first and the second rotary valves 16, 22 may be driven continuously. By simultaneously driving the first and second rotary valve 16, 22 no solid particles need to be stored in the intermediate channel 30. The intermediate channel 30 only needs to transfer the solid particles from the first rotary valve 16 to the second rotary valve 22. Because the invention prevents a gas flow from the first environment 12 into the second environment 14 and vice versa, there is no need for a batch transfer of solid particles as is required by a lock hopper system. Instead the solid particles can be transferred continuously, which means that the first and second rotary valves 16, 22 may be operated continuously.

In an embodiment the intermediate channel housing 28 comprises a pipe or tube. Of course, the pipe or tube may include additional equipment, such as a slide valve. Because total gaseous isolation between the first environment 12 and the second environment 14 is achieved by maintaining the third gas pressure either higher than both the first and second gas pressures or lower than both the first and second gas pressures, the intermediate channel housing 28 does not need to comprise a system for gas isolation. This means a simple design of the intermediate channel housing 28 will suffice.

In an embodiment the inlet 18 of the first rotary valve 16 is situated above or at a higher level than the outlet 20 of the first rotary valve 16. The inlet 24 of the second rotary valve 22 may be situated above or at a higher level than the outlet 26 of the second rotary valve 22. The outlet 20 of the first rotary valve 16 may be situated above or at a higher level than the inlet 24 of the second rotary valve 22. In this way gravity can be used to transfer the solid particles from the first environment 12 to the second environment 14, via the first rotary valve 16, the intermediate channel 30 and the second rotary valve 22.

In an embodiment the third gas pressure is maintained at a sub-atmospheric pressure. The sub-atmospheric pressure may be used to remove air from the intermediate channel 30, before solid particles enter the intermediate channel 30 and during the transferring of solid particles in the intermediate channel 30. This is e.g. advantageous when exposure of solid materials to air is undesired, e.g. because the solid materials are flammable.

In an embodiment the third gas pressure is maintained lower than the first gas pressure and the second gas pressure. The system comprises a low pressure sink 36, wherein a pressure of the low pressure sink 36 is lower than the third gas pressure. The low pressure sink 36 may be embodied as a vacuum pump. The system 10 may further comprise a bleed valve 38 of which an inlet 40 is fluidly connected to the third environment 44 and an outlet is fluidly connected to the low pressure sink 36. The bleed valve 38, in operation, allows gas from the third environment 44 and the intermediate channel 30 to leak away towards the low pressure sink 36. The bleed valve 38 is used to limit or regulate the outflow of gas from the third environment 44 and the intermediate channel 30 to the low pressure sink 36, thus ensuring the intermediate channel 30 has a stable environment.

In an alternative embodiment, the system may comprise a high pressure source, of which an outlet is fluidly connected to the third environment 44, and which, in operation maintains the third gas pressure higher than the first gas pressure and the second gas pressure. Optionally, the system may further comprise a bleed valve of which an inlet is fluidly connected to the high pressure source and of which an outlet is fluidly connected to the third environment 44. The bleed valve is used to limit or regulate the inflow of gas from the high pressure source to the third environment 44 and the intermediate channel 30, thus ensuring the intermediate channel 30 has a stable environment. The high pressure source may comprise a gas pump 42. The gas pump 42 may be embodied as a gas compressor or a gas blower. Optionally, the high pressure source may include a high pressure vessel.

The invention further relates to a method for transferring solid particles from a first environment 12 at a first gas pressure to a second environment 14 at a second gas pressure. The method comprises providing a system 10 for transferring the solid particles. The system 10 comprises a first rotary valve 16, a second rotary valve 22, and an intermediate channel housing 28. The first rotary valve 16 has an inlet 18 which is in fluid communication with the first environment 12. The second rotary valve 22 has an outlet 26 which is in fluid communication with the second environment 14. The intermediate channel housing 28 bounds an intermediate channel 30. An inlet 32 of the intermediate channel housing 28 is fluidly connected to an outlet 20 of the first rotary valve 16. An outlet 34 of the intermediate channel housing 28 is fluidly connected to an inlet 24 of the second rotary valve 22. The intermediate channel 30 is fluidly connected to a third environment 44. The first rotary valve 16, in operation, allows the solid particles to transfer from the first environment 12 to the intermediate channel 30. The second rotary valve 22, in operation, allows the solid particles to transfer from the intermediate channel 30 to the second environment 14. The method further comprises maintaining a third gas pressure in the third environment 44 at a pressure which is either higher than both the first gas pressure and the second gas pressure or lower than both the first gas pressure and the second gas pressure.

The effects and advantages of the method for transferring solid particles from a first environment 12 at a first gas pressure to a second environment 14 at a second gas pressure have been described in the summary section and these effects and advantages are inserted here by reference.

In an embodiment the third gas pressure is maintained at a sub-atmospheric pressure. The method further comprises removing air from the intermediate channel 30 before and during transferring solid particles from the first environment 12 to the second environment 14. This is e.g. advantageous when exposure of solid materials to air is undesired, e.g. because the solid materials are flammable.

The various embodiments which are described above may be implemented independently from one another and may be combined with one another in various ways. The reference numbers used in the detailed description and the claims do not limit the description of the embodiments nor do they limit the claims. The reference numbers are solely used to clarify.

Legend
10-system
12-first environment
14-second environment
16-first rotary valve
18-inlet (of the first rotary valve)
20-outlet (of the first rotary valve)
22-second rotary valve
24-inlet (of the second rotary valve)
26-outlet (of the second rotary valve)
28-intermediate channel housing
30-intermediate channel
32-inlet (of the intermediate channel housing)
34-outlet (of the intermediate channel housing)
36-low pressure sink
38-bleed valve
40-inlet (of the bleed valve)
42-gas pump
44-third environment

The invention claimed is:

1. A system for transferring solid particles from a first environment at a first gas pressure to a second environment at a second gas pressure, wherein the system comprises:
   a first rotary valve having an inlet which is in fluid communication with the first environment;
   a second rotary valve having an outlet which is in fluid communication with the second environment; and
   an intermediate channel housing bounding an intermediate channel, the intermediate channel housing having an inlet which is fluidly connected to an outlet of the first rotary valve and having an outlet which is fluidly connected to an inlet of the second rotary valve;
   wherein in operation of the system, the first rotary valve and the second rotary valve both operate simultaneously and continuously to transfer solid particles from the first environment to the second environment in a batch-less, continuous manner;
   the inlet of first rotary valve being situated at a higher level than the outlet of the first rotary valve;
   the inlet of the second rotary valve being situated at a higher level than the outlet of the second rotary valve;
   the outlet of the first rotary valve being situated at a higher level than the inlet of the second rotary valve;
   wherein the first rotary valve, in operation, allows the solid particles to transfer from the first environment to the intermediate channel,
   wherein the second rotary valve, in operation, allows the solid particles to transfer from the intermediate channel to the second environment, and
   wherein the intermediate channel is fluidly connected to a third environment maintained at a third gas pressure, wherein the third gas pressure is higher than both the first gas pressure and the second gas pressure or lower than both the first gas pressure and the second gas pressure, providing a total gaseous isolation between the first environment and the second environment.

2. The system according to claim 1, wherein the intermediate channel housing comprises a pipe or tube.

3. The system according to claim 1, wherein the third gas pressure is maintained at a sub-atmospheric pressure.

4. The system according to claim 1, wherein the third gas pressure is maintained lower than the first gas pressure and the second gas pressure, wherein the system comprises a low pressure sink, wherein a pressure of the low pressure sink is lower than the third gas pressure, and wherein the system further comprises a bleed valve of which an inlet is fluidly connected to the third environment and of which an outlet is fluidly connected to the low pressure sink, and which, in operation, allows gas from the third environment and the intermediate channel to leak away toward the low pressure sink.

5. The system according to claim 1, wherein the system further comprises a high pressure source, of which an outlet is fluidly connected to the third environment, and which, in operation maintains the third gas pressure higher than the first gas pressure and the second gas pressure.

6. The system according to claim 5, wherein the high pressure source comprises a gas pump.

7. A method for transferring solid particles from a first environment at a first gas pressure to a second environment at a second gas pressure, wherein the method comprises:
   providing a system for transferring the solid particles, the system comprising:
   a first rotary valve having an inlet which is in fluid communication with the first environment;
   a second rotary valve having an outlet which is in fluid communication with the second environment; and
   an intermediate channel housing bounding an intermediate channel, the intermediate channel housing having an inlet which is fluidly connected to an outlet of the first rotary valve and having an outlet which is fluidly connected to an inlet of the second rotary valve, the intermediate channel being fluidly connected to a third environment,
   the inlet of first rotary valve being situated at a higher level than the outlet of the first rotary valve;
   the inlet of the second rotary valve being situated at a higher level than the outlet of the second rotary valve; and
   the outlet of the first rotary valve being situated at a higher level than the inlet of the second rotary valve;
   wherein the first rotary valve, in operation, allows the solid particles to transfer from the first environment to the intermediate channel,
   wherein the second rotary valve, in operation, allows the solid particles to transfer from the intermediate channel to the second environment,
   driving the first and second rotary valves simultaneously and continuously to transfer solid particles from the first environment to the second environment in a batch-less, continuous manner, and
   during the simultaneous and continuous driving of the first and second rotary valves, maintaining a third gas pressure in the third environment at a pressure which is either higher than both the first gas pressure and the second gas pressure or lower than both the first gas pressure and the second gas pressure, so that a total gaseous isolation between the first environment and the second environment is achieved during the simultaneous and continuous driving of the first and second rotary valves.

8. The method according to claim 7, wherein the third gas pressure is maintained at a sub-atmospheric pressure, and wherein the method further comprises removing air from the intermediate channel before and during transferring solid particles from the first environment to the second environment.

* * * * *